US007676588B2

(12) United States Patent
Georgiou et al.

(10) Patent No.: US 7,676,588 B2
(45) Date of Patent: Mar. 9, 2010

(54) PROGRAMMABLE NETWORK PROTOCOL HANDLER ARCHITECTURE

(75) Inventors: Christos John Georgiou, Scarsdale, NY (US); Monty Montague Denneau, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 11/387,875

(22) Filed: Mar. 24, 2006

(65) Prior Publication Data

US 2006/0168283 A1 Jul. 27, 2006

Related U.S. Application Data

(63) Continuation-in-part of application No. 09/682,688, filed on Oct. 5, 2001, now Pat. No. 7,072,970.

(51) Int. Cl.
*G06F 15/16* (2006.01)
*G06F 3/00* (2006.01)

(52) U.S. Cl. ............... 709/230; 709/201; 709/232; 710/1; 710/52

(58) Field of Classification Search ............ 709/201, 709/230–232; 710/1, 52; 712/1, 10
See application file for complete search history.

(56) References Cited

U.S. PATENT DOCUMENTS

| 4,674,034 A | | 6/1987 | Iwashita |
| 5,047,919 A | | 9/1991 | Sterling et al. |
| 5,353,418 A | | 10/1994 | Nikhil et al. |
| 5,428,766 A | | 6/1995 | Seaman |
| 5,471,592 A | * | 11/1995 | Gove et al. ............ 709/213 |
| 5,513,354 A | | 4/1996 | Dwork et al. |
| 5,519,867 A | | 5/1996 | Moeller et al. |
| 5,560,029 A | | 9/1996 | Papadopoulos et al. |
| 5,640,584 A | | 6/1997 | Kandasamy et al. |
| 5,649,135 A | | 7/1997 | Pechanek et al. |
| 5,764,905 A | | 6/1998 | Catozzi et al. |
| 5,812,811 A | | 9/1998 | Dubey et al. |
| 5,815,727 A | | 9/1998 | Motomura |
| 5,828,880 A | | 10/1998 | Hanko |
| 5,835,763 A | | 11/1998 | Klein |
| 5,901,324 A | * | 5/1999 | Ogi ............... 712/28 |
| 5,913,925 A | | 6/1999 | Kahle et al. |
| 6,006,325 A | * | 12/1999 | Burger et al. ............ 712/214 |

(Continued)

*Primary Examiner*—Nathan Flynn
*Assistant Examiner*—Joshua Joo
(74) *Attorney, Agent, or Firm*—Whitham, Curtis, Christofferson & Cook, P.C.; Michael J. LaStrange

(57) ABSTRACT

An architecture that achieves high speed performance in a network protocol handler combines parallelism and pipelining in multiple programmable processors, along with specialized front-end logic at the network interface that handles time critical protocol operations. The multiple processors are interconnected via a high-speed interconnect, using a multi-token counter protocol for data transmission between processors and between processors and memory. Each processor's memory is globally accessible by other processors, and memory synchronization operations are used to obviate the need for "spin-locks". Each processor has multiple threads, each capable of fully executing programs. Threads within a processor are assigned the processing of various protocol functions in a parallel/pipelined fashion. Data frame processing is done by one or more of the threads to identify related frames. Related frames are dispatched to the same thread so as to minimize the overhead associated with memory accesses and general protocol processing.

15 Claims, 10 Drawing Sheets

U.S. PATENT DOCUMENTS

| | | |
|---|---|---|
| 6,047,002 A | 4/2000 | Hartmann et al. |
| 6,079,008 A | 6/2000 | Clery, III |
| 6,085,233 A | 7/2000 | Jeffrey et al. |
| 6,092,175 A | 7/2000 | Levy et al. |
| 6,105,127 A | 8/2000 | Kimura et al. |
| 6,128,720 A | 10/2000 | Pechanek et al. |
| 6,393,026 B1 | 5/2002 | Irwin |
| 6,460,124 B1* | 10/2002 | Kagi et al. .................. 711/163 |
| 6,570,883 B1* | 5/2003 | Wong ......................... 370/412 |
| 6,606,704 B1 | 8/2003 | Adiletta et al. |
| 6,629,257 B1 | 9/2003 | Hartwell |
| 6,836,808 B2 | 12/2004 | Bunce et al. |
| 6,895,013 B1 | 5/2005 | Burns et al. |
| 7,185,178 B1* | 2/2007 | Barreh et al. ................ 712/206 |
| 7,210,022 B2* | 4/2007 | Jungck et al. ................. 712/34 |
| 7,406,557 B2* | 7/2008 | Dao et al. .................... 710/305 |
| 2001/0025324 A1 | 9/2001 | Gamo |
| 2001/0037424 A1* | 11/2001 | Singh et al. ................. 710/220 |
| 2005/0036502 A1* | 2/2005 | Blanc et al. ................. 370/412 |
| 2005/0265370 A1* | 12/2005 | Fuente et al. ............... 370/412 |
| 2006/0039374 A1* | 2/2006 | Belz et al. ................... 370/389 |

* cited by examiner

PROGRAMMABLE NETWORK PROTOCOL HANDLER ARCHITECTURE

This application is a continuation in part from U.S. patent application Ser. No. 09/682,688 filed Oct. 5, 2001 now U.S. Pat. No. 7,072,970 of the same title, which is incorporated by reference herein.

BACKGROUND OF THE INVENTION

1. Field of the Invention

The present invention generally relates to network communications systems and, more particularly, to a programmable network protocol handler architecture that achieves high speed performance.

2. Background Description

Currently available network protocol handlers are implemented as hardwired logic, but there are also several programmable implementations. Custom integrated circuits (ICs), or application specific integrated circuits (ASICs), achieve good performance, but are inflexible solutions and are inefficient to handle emerging or evolving network architectures. Programmable protocol handlers are based either on a single processor implementation (which may be embedded on a chip or implemented off chip) or have multiple picoprocessors controlled by a hierarchical controller (such as the IBM PowerNP network processor). All these solutions have dynamic random access memory (DRAM) external to the chip.

Programmable architecture is easier to implement than hardwired logic. Changes to specification can be easily accommodated by changing the program, and the architecture can be personalized to handle different protocols. However, current programmable engines based on single reduced instruction set computer (RISC) architecture (such as the QLogic ISP2300 Fibre Channel processor) are not fast enough for handling multi-gigabit/second (e.g., 10 Gb/s) transmission bit-rates.

In the prior art, protocol handler chips consist of hardwired logic that handles time critical operations, buffers, and a processor engine for executing high-level protocol commands and managing the overall chip function. In such chips, typically only one resource is assigned to execute a particular protocol task. Thus, such resources can become performance bottlenecks when the network traffic workload is increased.

SUMMARY OF THE INVENTION

It is therefore an object of the present invention to provide an architecture that achieves high speed performance in a network protocol handler. In the preferred embodiment, the Fibre Channel protocol is implemented; however, the architecture can be the basis for implementing many other network protocols; e.g., Giga-Ethernet, Infiniband or Internet protocol (IP) over small computer system interface (i-SCSI).

This invention introduces a programmable system based on a multiple processor and multiple threads architecture containing embedded DRAM. The architecture offers the advantages of being easily programmable, and providing balanced computing resources. This is particularly important for the future implementation of emerging protocols (such as, for example, 10 Gb/s Fibre Channel, 10 Gb/s Ethernet, etc.), since the functionality and computing requirements of such networks are still not completely specified. A single network processor may not have the computing capabilities to handle all the requirements of a very complex protocol, while bundling multiple processors to work in parallel on a single job may be hard to accomplish.

In the architecture according to the invention, performance is achieved via a combination of parallelism and pipelining, along with specialized front-end logic that handles time critical protocol operations. More specifically, a front-end hardwired logic at the network interface handles time critical operations, such as encoding/decoding, cyclic redundancy check (CRC) generation/checking, interpretation of some header bits and functions, etc. Multiple processors are used. These processors are interconnected via the processor's high-speed interconnect, which can be implemented as a ring, switch, bus, or any other processor interconnect architecture. Each processor has multiple threads, each capable of fully executing programs, and each processor's memory is globally accessible by other processors. Each processor has a memory hierarchy, consisting of embedded dynamic random access memory (DRAM) and can include data caches, instruction caches, scratch pad static random access memory (SRAM), or any combination of these memory elements. Threads within a processor are assigned the processing of various protocol functions in a parallel/pipelined fashion. Data frame processing is done by one or more of the threads to identify related frames. Related frames are dispatched to the same thread so as to minimize the overhead associated with memory accesses and general protocol processing.

The invention also addresses the problem of serialization bottlenecks arising from the use of single resources by using multiple on-chip resources and a method for monitoring resource activity and reallocating the workload to the resources that are being least used.

An aspect of the invention is a system for converting network communications data between multiple communications protocols. The system operates with a high speed interconnect, a plurality of programmable processors, and a multi-token counter protocol. Each of the programmable processors has multiple hardwired thread units, and each thread unit is capable of fully executing programs and, in particular, is able to perform communications protocol conversion of data frames. The multi-token protocol is used for pipelining communications between a source processor element and a destination processor element because the round trip latency for these communications is two or more clock cycles of the system for at least one pipelined pair of source and destination processor elements. The source processor element has a token for each empty buffer location in the destination processor element, the source processor element decrements a token counter when it sends a packet, and upon removing a received packet from its input buffer the destination processor element sends a signal to the source processor element to increment the token counter. Each processor is capable of accessing memory of other processors, and does so by executing memory instructions. Synchronization operations are performed in a controller of the accessed memory, and a result of a synchronization operation on the memory of a processor is provided to the processor, the result indicating whether the synchronization operation was performed by the processor or by another processor. In a preferred embodiment of this aspect of the invention, the high speed interconnect is implemented as a crossbar.

In another aspect of the invention, the round trip latency between the source processor element and the destination processor element, measured in clock cycles, is equal to or less than a set number, and the multi-token protocol is implemented allocating to the source said set number of buffers at the destination and providing the source with a token for each buffer location at the destination. There is a token counter at the source, where the value of token counter is set to the number of allocated buffers that is empty. The protocol is further implemented by decrementing the token counter upon transmission of a request from the source to the destination, incrementing the token counter upon receipt by the source of an acknowledgment from the destination that a request has been processed, and delaying transmission of a request by the source to the destination until the token counter has a value greater than zero.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
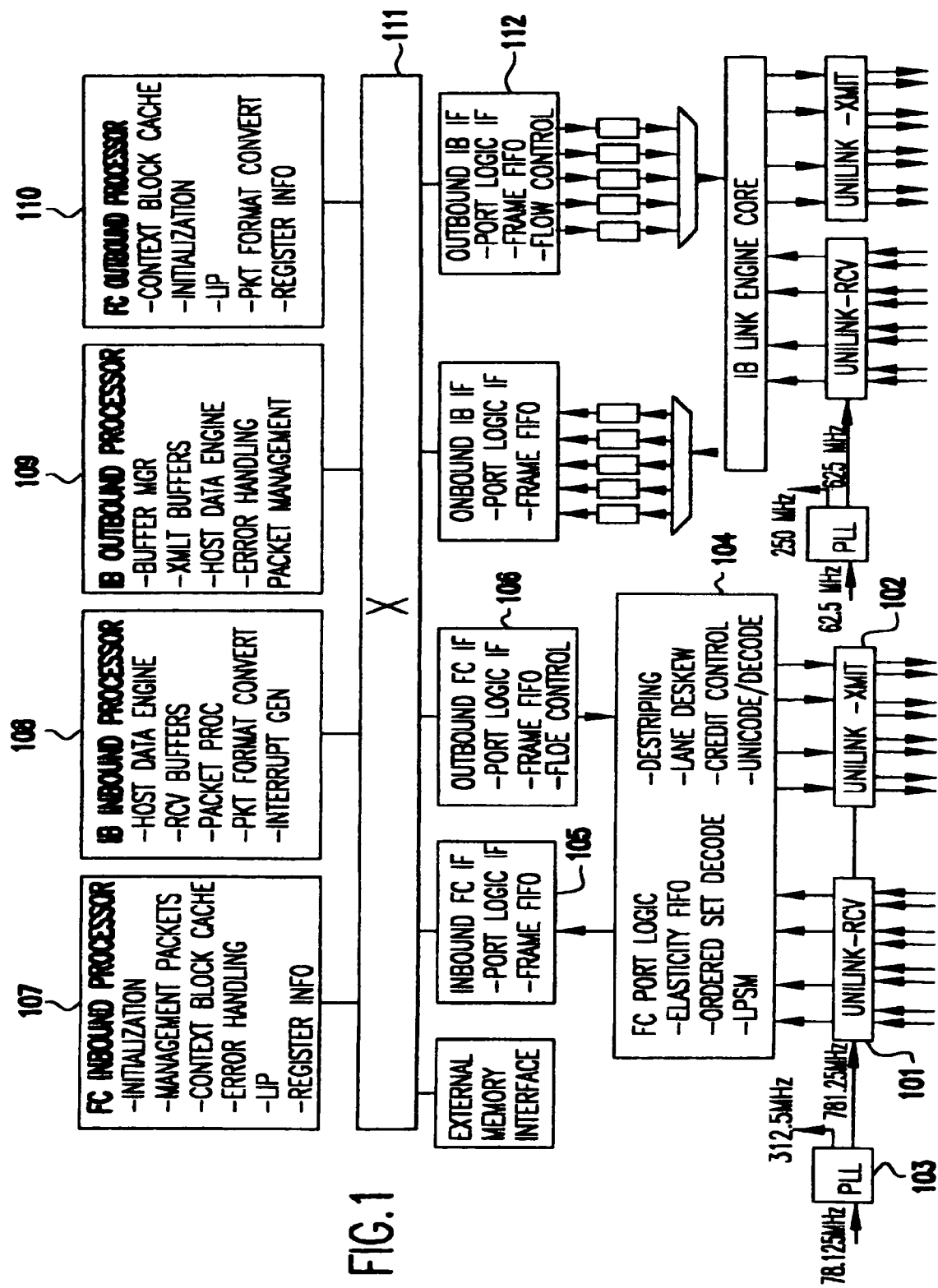
FIG. 1 is block diagram showing the overall programmable architecture according to the invention.

Referring now to the drawings, and more particularly to FIG. 1, there is shown the overall programmable architecture according to the invention. This architecture handles network traffic from one network protocol, performs traffic conversion from the first network protocol to a second network or bus protocol, and handles traffic of the second network or bus protocols. In our preferred embodiment, the architecture handles traffic from Fibre Channel (FC) and Infiniband (IB) network architectures. Connection to a network physical communication system is by means of receiver 101 and transmitter 102 supplied by a clock signal from a phase locked loop (PLL) 103. The receiver 101 and transmitter 102 are connected to hard-wired fiber channel (FC) port logic 104 which outputs frame data to an inbound FC interface (IF) 105 and receives frame data from an outbound FC interface (IF) 106.

As seen in FIG. 1, the preferred embodiment of four processors 107, 108, 109, 110, connected by interprocessor high-speed interconnect 111, are assigned the tasks of handling network protocol, but any number of processors can be assigned to handle network protocol tasks, depending on the capabilities of the processors and of the complexity of the network protocol. Fibre Channel input traffic is handled by FC Inbound Processor 107, traffic into the Infiniband network is handled by the IB Inbound Processor 108, outbound traffic into the Fibre Channel network is handled by FC Outbound Processor 110, and traffic coming from the Infiniband network is handled by IB outbound processor 109. Within a processor 107, 108, 109, or 110, several identical threads perform various protocol sub-tasks.

Figure 2A:
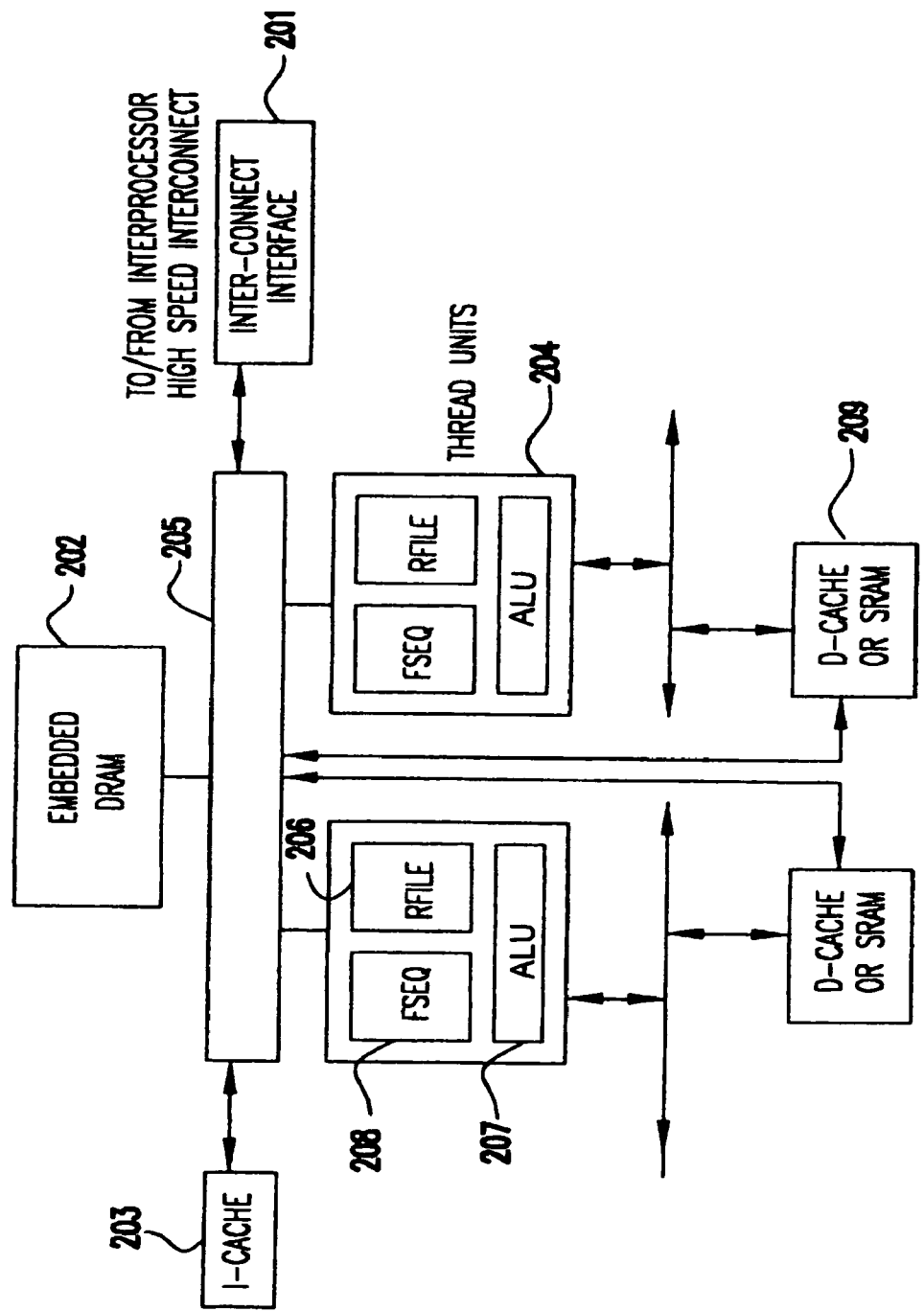
FIG. 2A is a block diagram showing the architecture and the memory hierarchy of one of the processors used in the system of FIG. 1.

FIG. 2A shows in more detail the parallel architecture of the processors 107 through 110. Inter-processor communication is implemented by means of the high-speed interconnect interface 201 which provides bi-directional data flow between this processor and the other elements of the system shown in FIG. 1. The processor incorporates embedded DRAM 202 which is a local memory of this processor, but which is accessible in part or as a whole by other processors globally. The processor contains also one or more instruction caches 203, and multiple identical thread units 204. The processor elements communicate via a high-speed interconnect device 205 which can be implemented as a local bus, switch, or any other implementation.

Each thread unit 204 incorporates a register file (Rfile) 206, a program counter, an arithmetic logic unit (ALU) 207, and logic for instruction fetching, decoding and dispatching 208. A single thread unit 204 can or can not have logic for instruction pre-fetching and storing, branch prediction mechanisms and logic for out-of-order execution and speculation. The processor can have multiple data caches (D-caches) 209, dedicating one cache block to each thread unit, or sharing a single D-cache block among several thread units 204. Instead of having a data cache, or in addition to it, an implementation can have a scratch pad memory, again shared between multiple thread units, or being local to only one thread unit 204.

Figure 3:
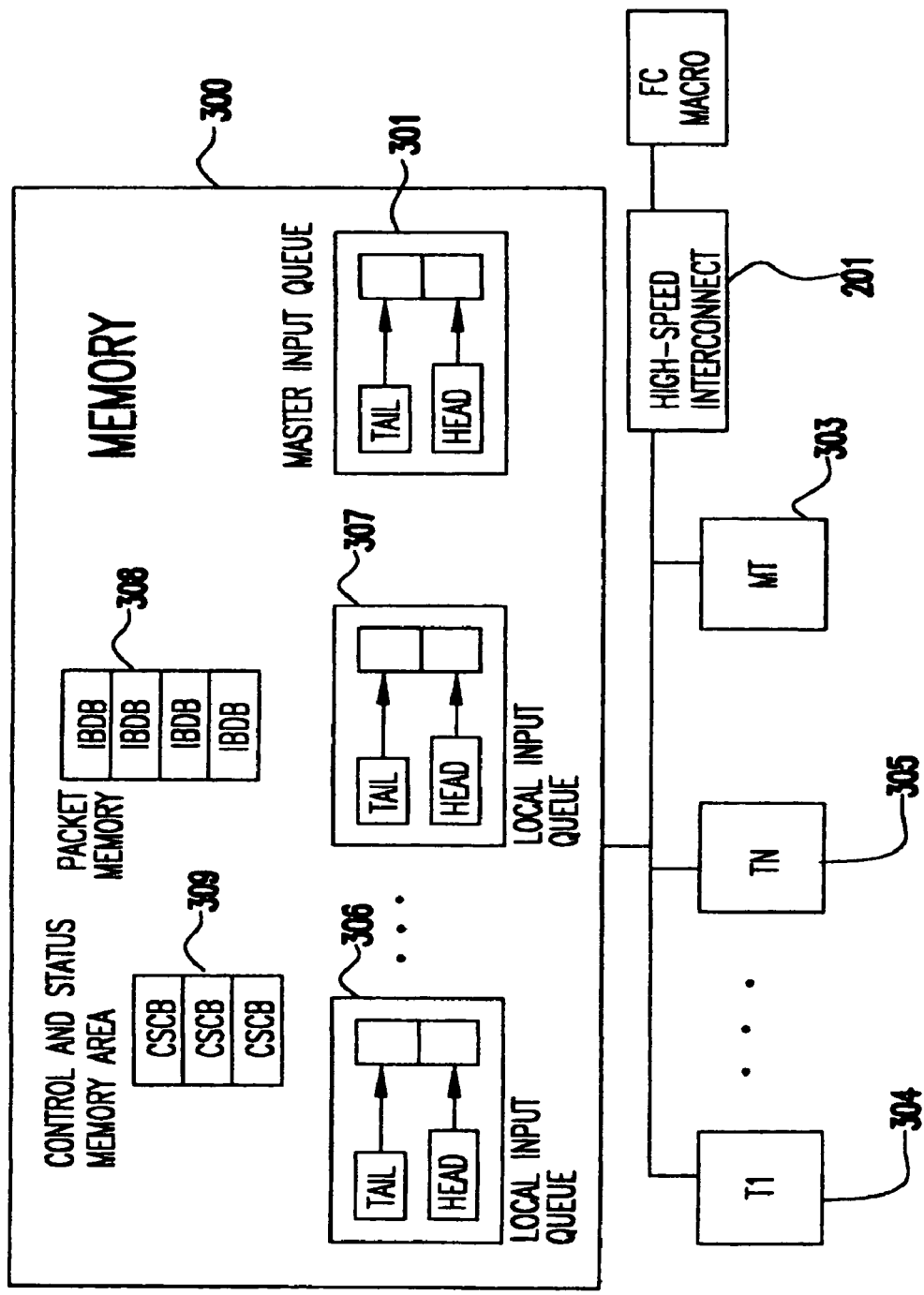
FIG. 3 is a block diagram showing the logical memory management and thread allocation technique.

Referring back to FIG. 1, inbound frames are first stored in frame first-in, first-out registers (FIFOs) at the FC interface 105. These can be dual FIFOs that operate in ping-pong fashion to prevent frame overruns or can be implemented as a single FIFO. In the preferred embodiment, associated with the FIFOs are two addresses, one pointing to a memory area in the FC inbound processor 107 where the header of an incoming frame will be written into, and the other pointing to a memory area in the IB outbound processor 109, for writing the payload of the frame (i.e., the data). Or in another embodiment, only one address is associated with the FIFO block, storing both the header and the payload of the frame. These addresses are set by the FC inbound processor 107 that manages the respective memory areas. Once a frame begins arriving into the FIFO, the FIFO logic moves first the header and then the payload into the preassigned inbound data block (IBDB) areas over the high-speed interconnection device As shown in FIG. 3, the beginning addresses of the two parts of the IBDB block or a single address of the IBDB block is added to a master input queue 301 by the thread 303 which manages the IBDB memory area. Then, this "master" thread assigns the incoming frames to one of the fixed number of threads 304 through 305 performing FC protocol. The frame dispatching is performed by a workload allocation function.

FIG. 3 shows the logical assignment of thread units of a processor 107 to protocol tasks and the logical organization of the memory 300. Memory 300 contains an area dedicated for packet storage 308, where the payload and headers of the frames are stored, an area for storing exchange and sequence status control blocks (ESCB and SSCB) 309, where various protocol specific information and the current status of the network traffic is stored, and area for working queues, where master input queue 301 and local input queues 306 to 307 are stored, as well as any other information required.

Several identical processor threads perform FC protocol tasks on the incoming frames. The protocol thread fetches the IBDB address of the frame from its corresponding local input queue, and uses it to access the frame header. Then, it fetches the control blocks associated with the frame from the memory (ESCB and SSCB), to begin frame processing. The FC protocol tasks include context switch, frame validation, frame reordering and acknowledgment generation. Once all required FC protocol tasks have been performed for a single frame, the IBDB address of the next frame is fetched from the local queue. If the local input queue is empty, the protocol thread goes into the "idle" state. In the "idle" state, the processor can check for new data by polling its local queue, or can wait for an interrupt or some particular external signal to get the new IBDB address.

Input Processing Unit

Figure 4:
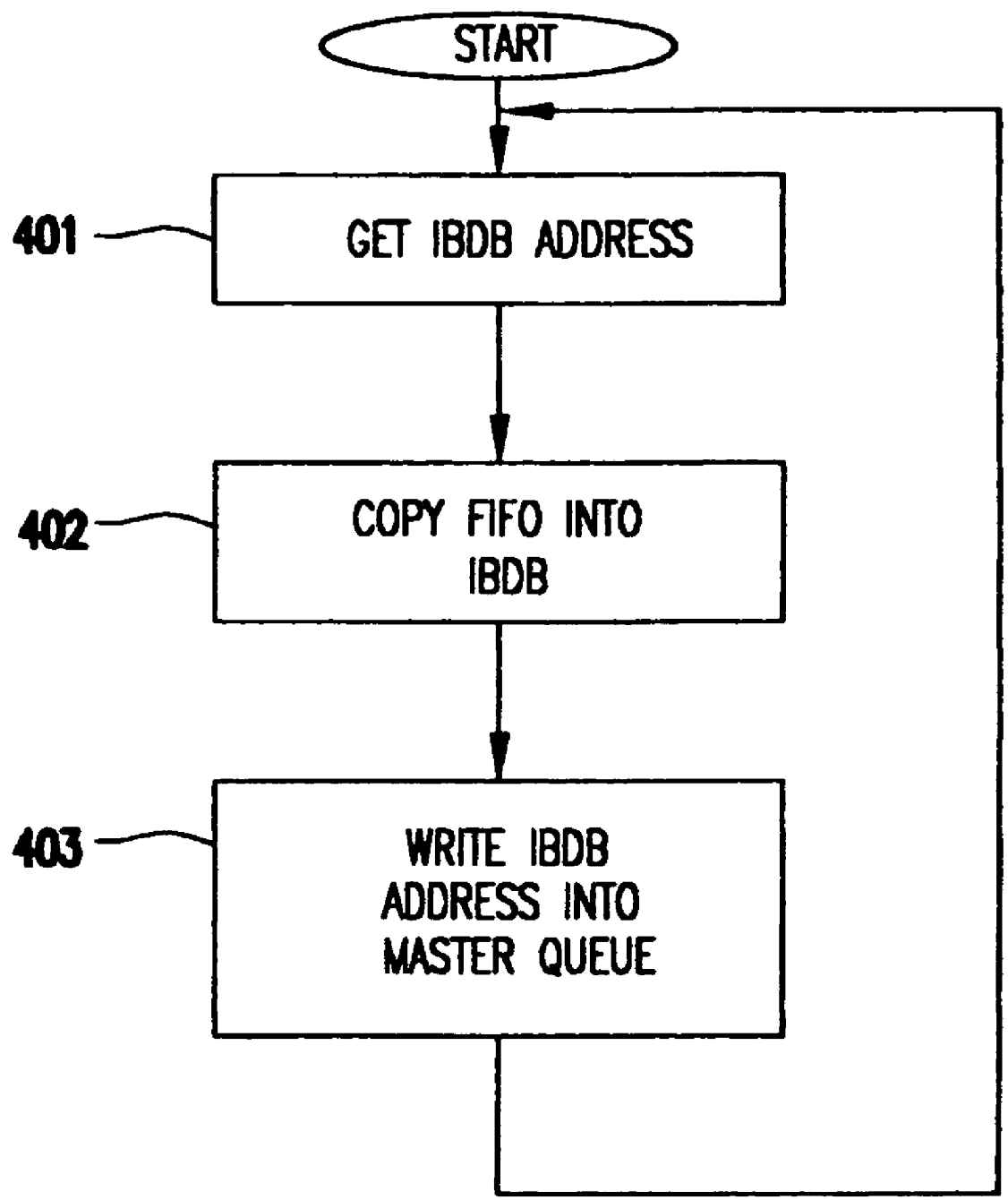
FIG. 4 is a flow diagram showing the process in which an inbound data block (IBDB) address is added to the master queue.

The task of the input processing unit is to copy data from the inbound FIFO to the packet memory 308, and to add the new IBDB address to the master input queue 301. This process is shown in FIG. 4. The process begins by retrieving the IBDB address in function block 401. The contents of the FIFO are copied into the IBDB in function block 402. The IBDB address is then written into the master queue in function block 403 before the process loops back to function block 401.

In one embodiment, the input processing unit can be implemented as a software application running on a dedicated thread. In another embodiment, this task can be performed by a direct memory access (DMA) unit with incorporated functionality 403 to add the IBDB address to the master input queue 301.

For each new packet, an address of the next free IBDB memory block has to be provided. This is done by reading the "first free IBDB pointer" from the chain of free IBDBs, and then adjusting the first free IBDB pointer to the next IBDB block in the chain. In the preferred embodiment, memory blocks for data and control areas are organized as a chain of free blocks, where the first element of the block contains the address of the next free memory block, but the memory can be organized in any other way.

Figure 5:
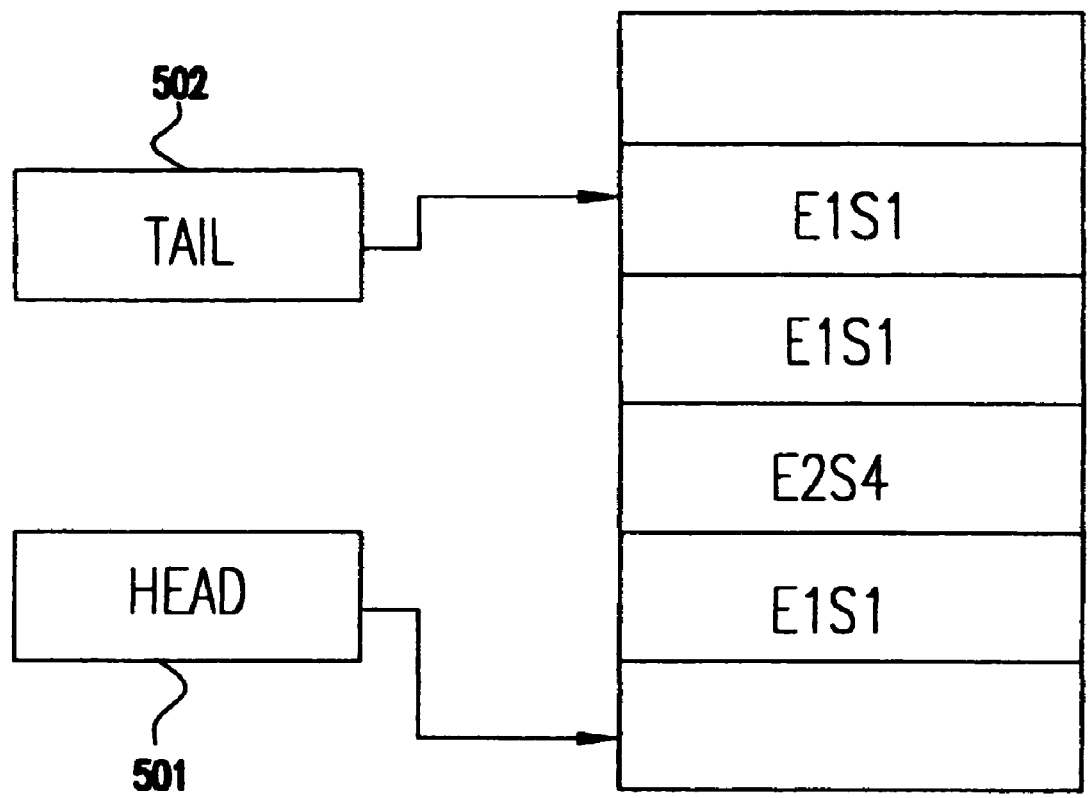
FIG. 5 is a block diagram showing the organization of the input queue as a ring buffer.

All input queues in this architecture are organized as ring buffers, with the first and last valid buffer locations recorded in the head and tail pointers 501 and 502 of the particular queue, respectively, as shown in FIG. 5. The head and tail pointers for each queue can be implemented as dedicated registers in hardware, or can be stored in the memory on the previously determined locations. In the latter case, the addresses of the memory locations containing these pointers are determined before the processing has begun and are not changed during the processing. In addition, the queues themselves can be implemented as dedicated hardware or can be stored in the memory on the previously determined locations.

Master Thread

The master thread dispatches the incoming frames to one of the threads performing FC protocol. To accomplish this, some packet assignment method is used. This is accomplished by using some workload allocation function, which can be implemented by using some well known method, e.g., table lookup, round-robin, first-come, first-serve, etc., or can be implemented to use data from the frame header or from the frame payload for allocating the frame to a particular thread.

To allocate the incoming frame to one of the threads performing the FC protocol, the master thread first fetches the address of the IBDB memory block of the incoming frame from the master input queue. Then, the workload allocation function is performed. If the workload allocation function requires data from the frame, these data are first fetched, and then the workload allocation function is performed. The result of the allocation function is the dispatching information, and the frame is assigned for processing to the corresponding protocol thread.

Figure 6:
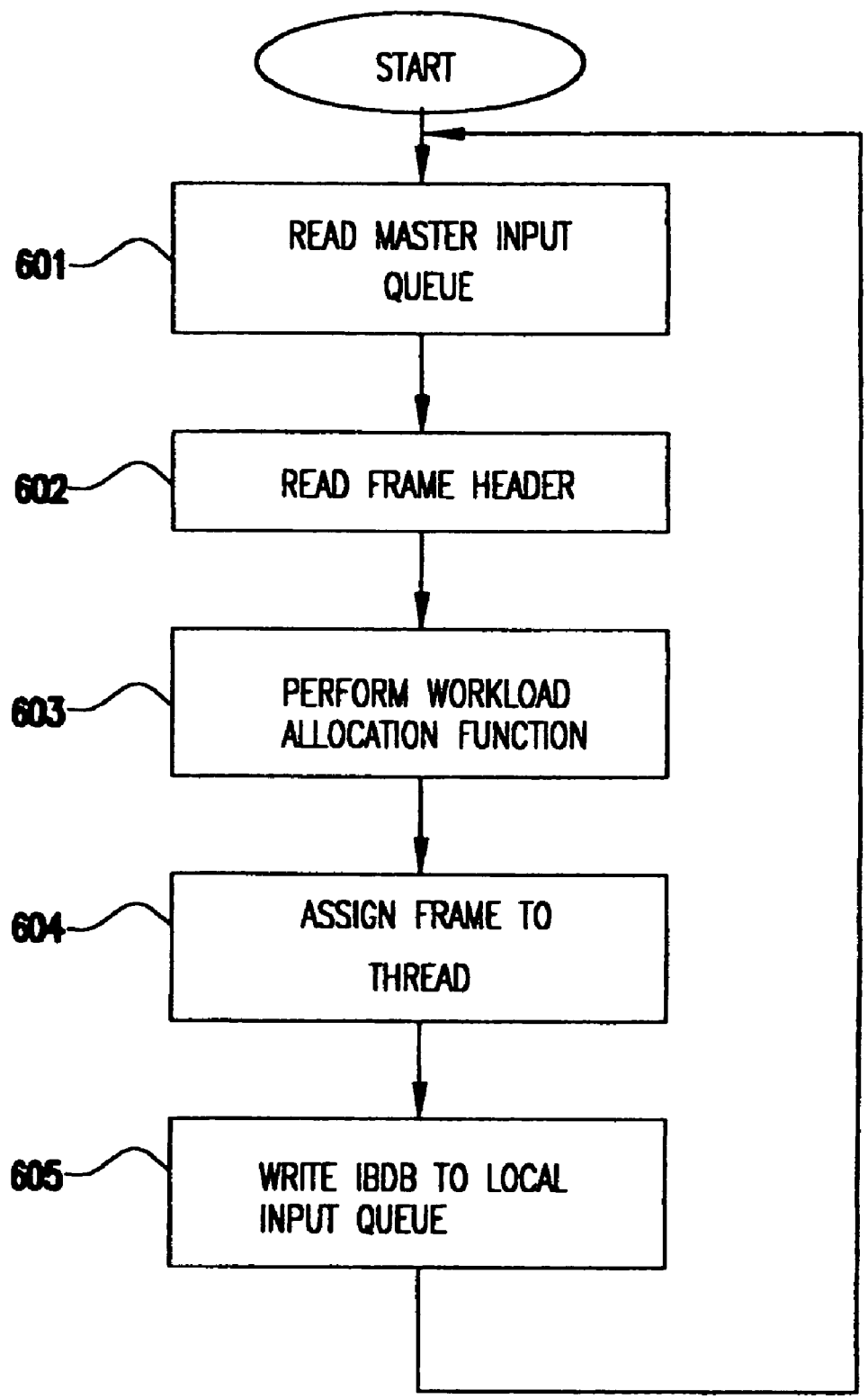
FIG. 6 is a flow diagram showing the process by which the master thread moves the IBDB address of the frame from the master input queue to the local input queue of the particular thread.

Once a frame has been assigned to a protocol thread, the master thread moves the IBDB address of the frame from the master input queue to the local input queue of the particular thread, as shown in FIG. 6. The process begins by reading the master input queue in function block 601. If frame data are required for the workload allocation function, these are fetched in function block 602. A workload allocation function is performed in function block 603, and then the frame is assigned to a thread in function block 604. The IBDB is written to the local input queue in function block 605 before the process loops back to function block 601.

Protocol Thread

There is a fixed number of protocol threads in our preferred embodiment. The protocol threads are identical and perform FC protocol-specific tasks. These tasks include context switch, frame validation, frame reordering and acknowledgment generation.

Figure 7:
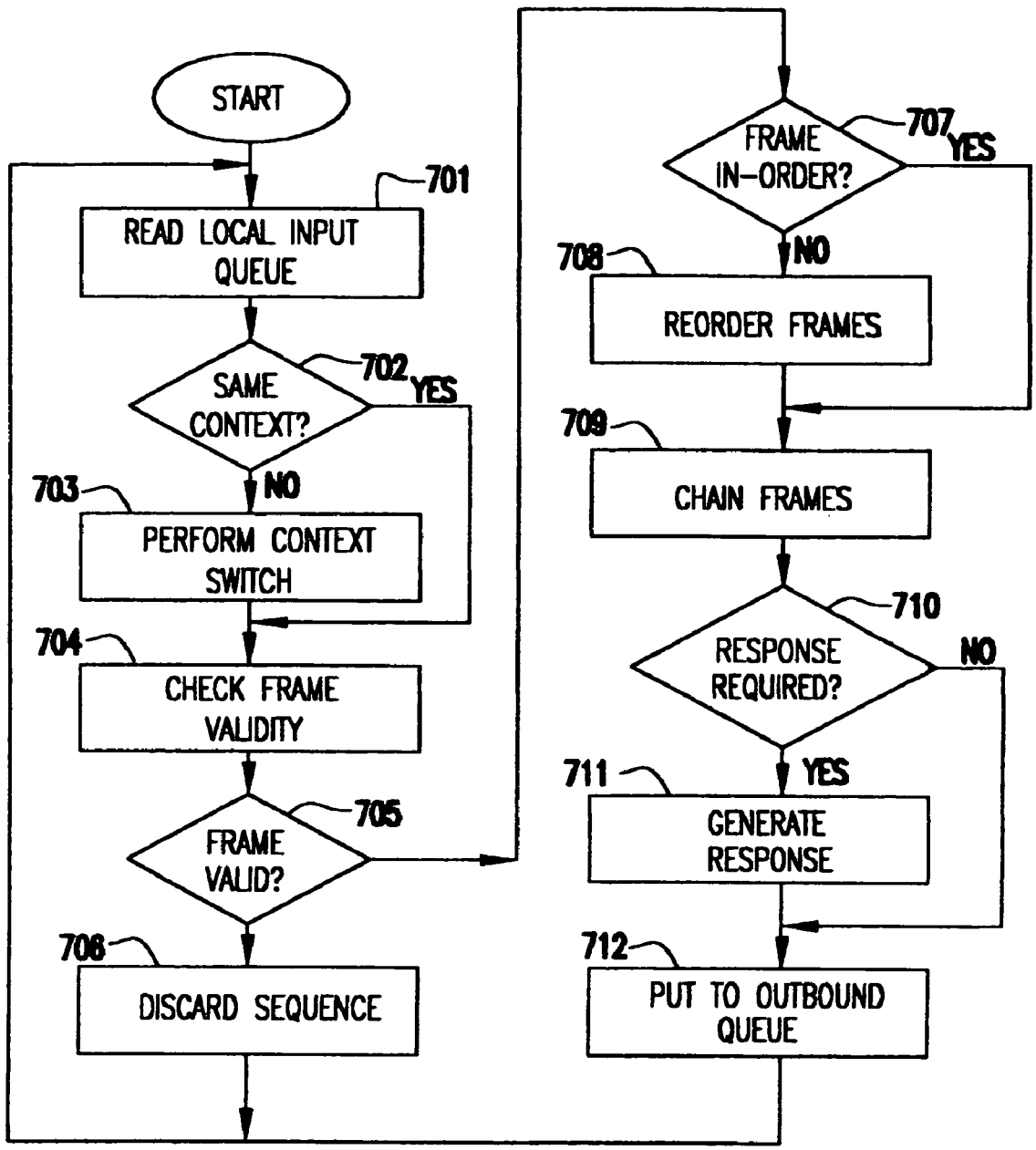
FIG. 7 is a flow diagram showing the process of allocating a thread to do the transfer of data from the inbound to the outbound processor.

Referring now to FIG. 7, the address of the IBDB block of a data frame is fetched from the local input queue of the protocol thread in function block 701. If a protocol thread is idle, the tail of the local queue is polled. The polling frequency is kept low, to reduce bus traffic.

To fetch the IBDB data from the local queue, the IBDB address from the location addressed by the ring buffer's tail 502 is read (see FIG. 5). The ring buffer tail address 502 is adjusted to the next location, and it is checked to see if the input queue is empty by comparing the addresses of the ring buffer's head 501 and tail 502.

The data frame is accessed using the IBDB address, and protocol tasks can be performed. The protocol thread fetches several data words from the frame header in the IBDB memory block, and compares it with the cached data in decision block 702. If the comparison shows that the frame belongs to the same sequence as the previous frame processed by that thread, neither context switching nor new data fetching needs to take place. Otherwise, context switching is performed in function block 703 and required data are fetched from the corresponding exchange and sequence status control blocks (ESCB and SSCB) from memory. Checking for the context switch reduces the number of memory accesses and bus traffic significantly, thus boosting overall performance.

The frame is then checked for validity in function block 704 and a determination is made in decision block 705 as to whether the frame is valid. If it is not, the sequence is discarded in function block 706, and the process loops back to function block 701. If the frame is valid and for certain classes of service, a determination is made in decision block 707 as to whether it has been received in order. If the frame has been received out of order and it is of class 2 service, it is placed in a reorder table in function block 708, so that the sequence can be delivered in its proper order.

The frame is chained to the previously received frame from the same sequence in function block 709. The chaining and reordering mechanism enables the system to link multiple data blocks in a single data stream, keeping the information needed to find the next data block in the sequence locally in the data block.

If the frame requires a response to be generated to the sender as determined in decision block 710, such as acknowledgment or busy message, a response frame is constructed in function block 711. All required data for the response are collected in an OBDB (outbound data block) block and the pointer of the OBDB block is sent to the outbound processor 110 (FIG. 1), which composes and transfers the response frame. The FC outbound processor 110 composes the response frame and transfers it to the outbound FIFO in the FC interface 106 in FIG. 1. The IBDB address of the data frame is then placed in the work queue of the thread for transferring the data to the host interface FIFO 112 (FIG. 1), as shown in the function block 712. This task is performed by the Infiniband outbound processor 109 (FIG. 1). From here, the data are sent to the Infiniband network.

It is also an object of the present invention to allocate the protocol handler resources, i.e., processors, memories and high-speed interconnect, based on the demand requirements of the workload. The monitoring of the activity of the various resources takes place as follows.

Processor Resources:

In the FC inbound processor 107 (FIG. 1) there is a master thread that assigns the processing of incoming frame headers to protocol threads. This is done by the master thread placing requests in queues stored in memory. When these queues become large, indicating that the processing of the frames has slowed down, the master thread can create request service queues in another processor's memory (such as the IB outbound processor 109), thus having threads in that processor service new incoming frames. This will reduce the workload in the FC inbound processor, thus increasing protocol handler performance.

Figure 8:
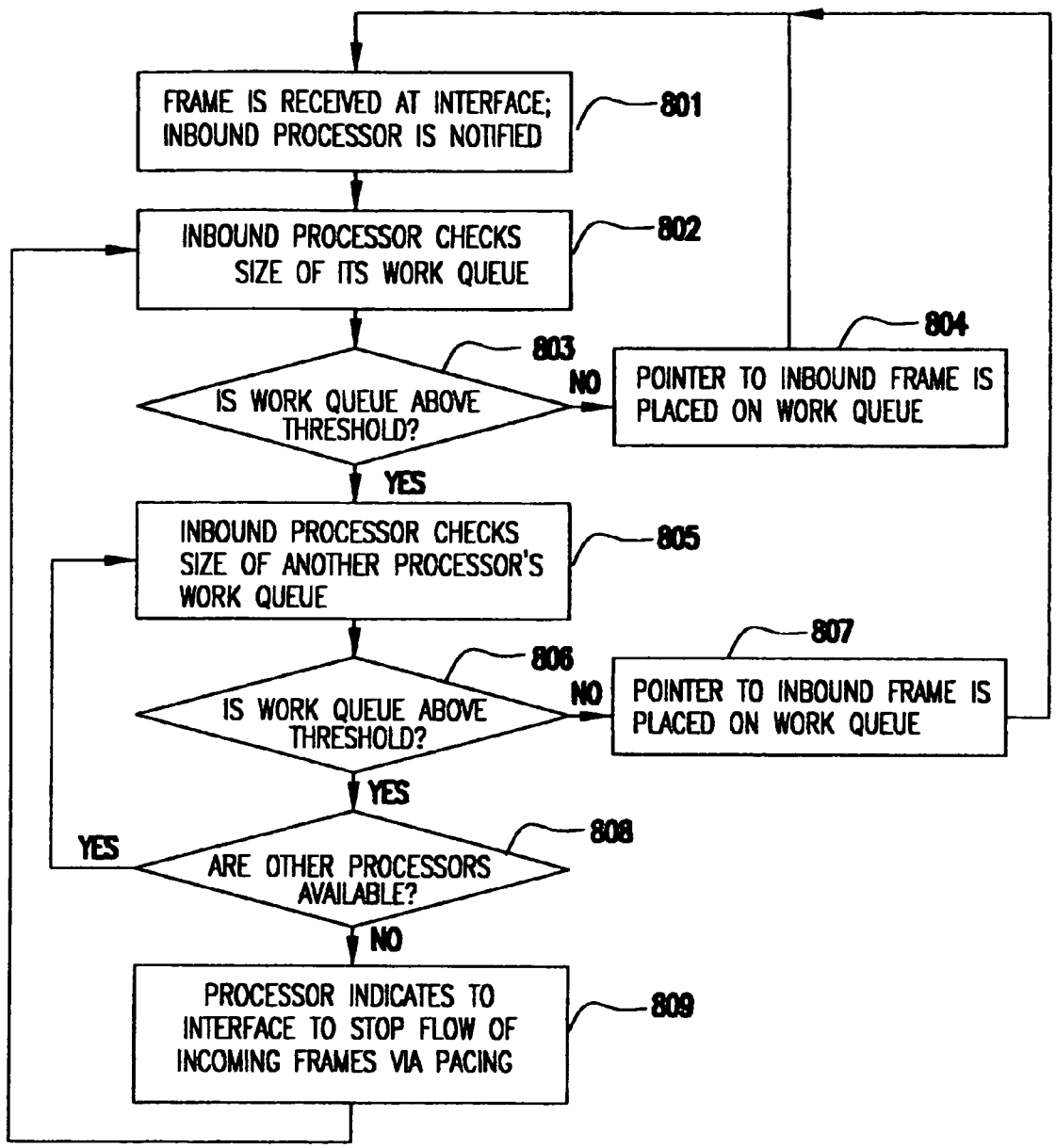
FIG. 8 is a flow diagram showing the process of monitoring and reallocating processor resources.

The process is shown in FIG. 8 and begins when a frame is received at the interface in function block 801. When this occurs, the inbound processor is notified and, in response, the inbound processor checks the size of its work queue in function block 802. A determination is made in decision block 803 as to whether the work queue is above a predetermined threshold. If not, the pointer to the inbound frame is placed on the work queue in function block 804, and the process loops back to function block 801 to await the next frame. If, however, the threshold is exceeded, the inbound processor checks the size of another processor's work queue in function block 805. A determination is made in decision block 806 as to whether the work queue of the other processor is above the threshold. If not, a pointer to the inbound frame is placed on the work queue of the other processor in function block 807, and the process loops back to function block 801 to await the next frame. If, however, the threshold is exceeded in the other processor's work queue, a determination is made in decision block 808 as to whether there are any other processors available. If so, the process loops back to function block 805 to check that processor's work queue; otherwise, the processor indicates to the interface to stop flow of incoming frames via pacing in function block 809. The process then loops back to function block 802 where the inbound processor again checks the size of its work queue.

Memory Resources:

Incoming frames are separated into header and payload parts, and the header is stored in the memory of the FC inbound processor 107 while the payload is stored in the memory of the IB outbound processor 109, so that it can be properly formatted for delivery to a destination in the Infiniband network. Associated with each processor's memory is a memory free list that provides pointers to available memory blocks. If the free list associated with a processor's memory is about to become empty, indicating that there is not any more available memory for storing incoming frames in that processor, the master thread that assigns memory blocks to the incoming frames can examine the free lists in other processors to determine the availability of corresponding memory. Then, the master thread can redirect the incoming traffic to a processor whose memory is under utilized.

Figure 9:
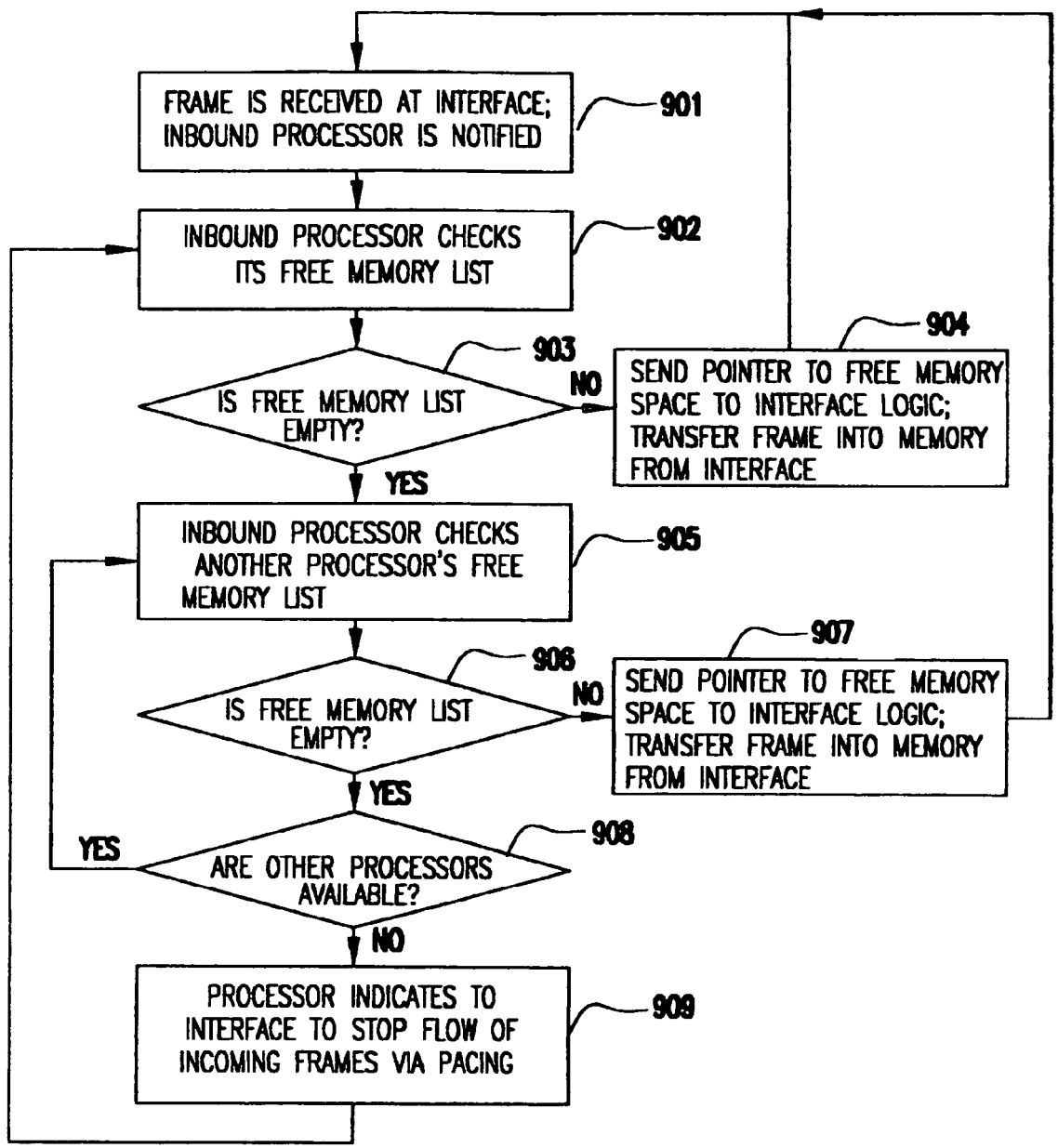
FIG. 9 is a flow diagram showing the process of monitoring and reallocating memory resources.

The process is shown in FIG. 9 and begins with a frame being received at the interface in function block 901. When this occurs, the inbound processor is notified and, in response, the inbound processor checks the size of its free memory list in function block 902. A determination is made in decision block 903 as to whether the free memory list is empty. If not, a pointer to free memory space is sent to the interface logic and the frame is transferred into memory from the interface in function block 904, and the process loops back to function block 901 to await the next frame. If, however, the free memory list is empty, the inbound processor checks another processor's free memory list in function block 905. A determination is made in decision block 906 as to whether the free memory list of the other processor is empty. If not, a pointer to free memory space is sent to the interface logic and the frame is transferred into memory from the interface logic in function block 907, and the process loops back to function block 901 to await the next frame. If, however, the free memory list of the other processor is empty, a determination is made in decision block 908 as to whether there are any other processors available. If so, the process loops back to function block 905 to check that processor's free memory list; otherwise, the processor indicates to the interface to stop flow of incoming frames via pacing in function block 909. The process then loops back to function block 902 where the inbound processor again checks the size of its free memory list.

Figure 2B:
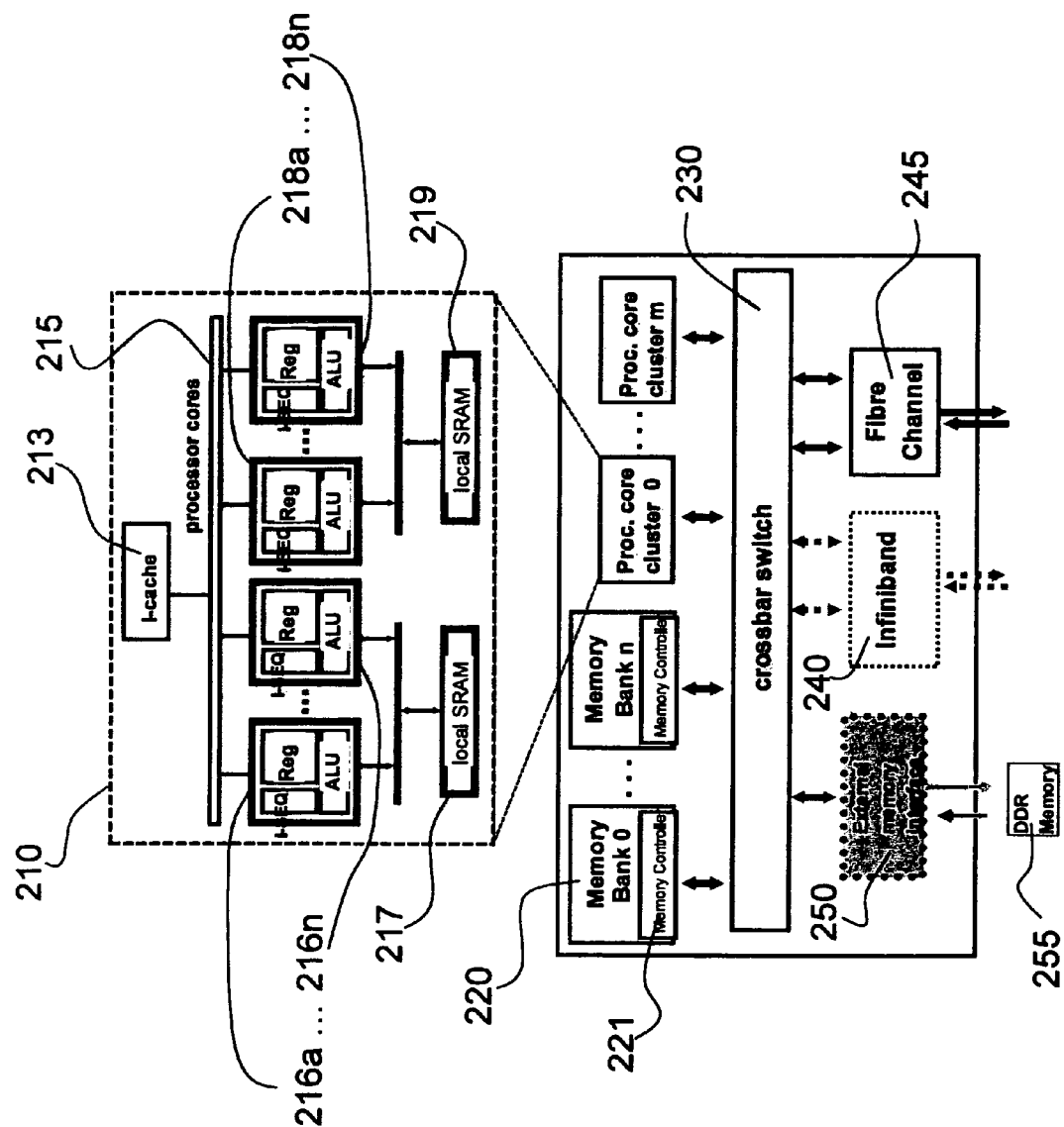
FIG. 2B is a block diagram showing processor core clusters and memory banks connected by a crossbar switch for handling Infiniband and Fibre Channel protocols.

Turning now to FIG. 2B there is a shown a block diagram having processor core clusters 210 and memory banks 220 connected by a crossbar switch 230 for handling Infiniband 240 and Fibre Channel 245 protocols. There is also shown an external memory interface 250 for access to double data rate (DDR) memory. In this figure both local and global memory are indicated. Local memory 217 serving individual thread units 216*a* . . . 216*n* and local memory 219 serving individual thread units 218*a* . . . 218*n* are contained within each processor core cluster 210. The processor elements communicate via a high-speed interconnect device 215 and are served by one or more instruction caches 213. When multiple processors from one or more processor core clusters seek access to a global memory bank 220 (for example, to read or update a free-list) it is necessary to have a mechanism for synchronization. In accordance with the invention this is achieved at memory controller 221 by using synchronization instruction (such as fetch-and-op or op-and-store), instead of spin locks that may result in time-consuming round trips over the crossbar 230.

To facilitate the implementation of the synchronization instructions, each memory controller 221 associated with a global memory bank 220 contains an adder and a logic unit that implements all 16 Boolean operations of two word-width variables. In the best mode of implementing the invention, each processor accesses memory of other processors programmatically. A single instruction type is able to accomplish a fetch-and-op or an op-and-store operation. If the target register of the instruction is zero then the operation is store-and-op and no result is returned to the processor (i.e. the memory controller 221 retrieves the original value of the memory, combines it with the value provided by the processor and stores the result back in the same location), otherwise the operation is fetch-and-op and the original contents of the memory location are returned to the processor, while the memory location is updated with the result of the operation.

For example, if a test-and-set operation is performed, if the processor gets a 0, it knows that it performed the operation, while if it gets a 1, it knows that the operation was performed by another processor.

The foregoing method of synchronization eliminates the need for "spin locks" (i.e. continuously checking to see if a resource is free), thereby improving performance by avoiding many round trips on the interconnect 230.

Interconnection Resources:

As previously stated, the high-speed interconnect among processors can be implemented as a ring, bus, or any other processor interconnect architecture, but in the preferred embodiment, the processor interconnect is implemented as dual counter-rotating rings. If a packet needs to be sent to another processor, the ring interface logic at the processor selects the ring that provides the shortest distance to the destination and places the packet into that ring. If the ring is busy at the time because another packet is in transit, it waits until the ring becomes available again. Alternatively, it can place the packet on the other ring. The performance of the interconnection rings can be optimized by balancing their workloads. This can be done by the ring interface logic which monitors the traffic on both rings by counting the packets that pass by, thus determining which ring has less traffic. The ring interface logic can then try first to place its packet on the ring that has the least traffic. This will minimize the possibility of waiting for other packets upstream and downstream.

Where a source can send a request to a destination and receive an acknowledgment in a single clock cycle, the source can send another request without delay. However, on a large die in combination with high clock rates, data transmitted from one point to a distant point cannot reach the destination in one cycle. Thus, we need to pipeline the transmission in multiple stages. Because the transmission distance is more than one clock cycle, the sending processor cannot immediately receive an acknowledgment that space is available at the buffer at the destination. This acknowledgment is necessary for the next transmission. But if several clock cycles are required to receive an acknowledgment, the transmission will be slowed down significantly. For example, if a source request requires two clock cycles to reach the destination, and two additional clock cycles are required for the acknowledgment to return, the source will have to wait four clock cycles before sending the next request.

The acknowledgment requirement is met by implementing a multi-token counter protocol, which works as follows. At startup, each sending processor is provided with a number of tokens, equal to the round trip latency (in terms of clock cycles) for requests sent from the source until an acknowledgment from the destination is received back at the source. Each transmitting processor or source is allocated a corresponding number of buffer locations at the destination, and a token counter at the source is set to that number. When the transmitting processor sends a packet it decrements the token counter. When the receiver at the destination removes a packet from its input buffer for further processing, it returns a signal to the sender to increment its token counter. For example, if there is a latency of four clock cycles the source can send one request in each of four successive clock cycles, each time decrementing the counter. If there is no contention from other sources sending requests to the same destination, then an acknowledgment that the first of the four requests has been serviced will be received at the fourth clock cycle. This will increment the counter, and allow the source to send another request at the fifth clock cycle.

If there is no contention at the destination this process will continue, with the source being able to send another request at each clock cycle. Thus this pipelining approach will avoid a transmission slowdown otherwise caused when the acknowledgment latency extends over multiple clock cycles. If there is contention at the destination there will be a delay in receiving an acknowledgment, and the source will have to wait until it receives an acknowledgment to increment the token counter. Thus the token counter serves as a scorekeeper, preventing the source from sending requests when there is no buffer space available at the destination.

The preferred implementation of the token counter protocol is with a crossbar as the high speed interconnect. However, the token counter protocol for latency periods extending over multiple clock cycles can also be applied to other high speed interconnect implementations, such as a ring structure.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A system for converting network communications data between multiple communications protocols, the system comprising:
   a high speed interconnect;
   a plurality of programmable processors, each processor having multiple hardwired thread units, each said hardwired thread unit being capable of fully executing programs, wherein the hardwired thread units are operable for performing communications protocol conversion of data frames; and
   means for implementing a multi-token counter protocol for pipelining communications between a source processor element and a destination processor element through said high-speed interconnect, a source processor element being a processor and a destination processor element being a processor or a processor memory, a round trip latency between a request sent by a source to a destination and receipt by the source of an acknowledgment from the destination over the high speed interconnect is two or more of a clock cycle of said system for at least one pipelined pair of processor elements,
   wherein the plurality of programmable processors perform data frame routing to another processor if a work queue of a processor receiving the data frame is above a threshold and if a work queue of the another processor is below a threshold;
   wherein the round trip latency between the source and the destination, measured in clock cycles, is equal to or less than a set number, and said means for implementing the multi-token counter protocol further comprising:
   means for allocating to each source, said set number of buffers at the destination;
   means for providing each source with a token for each buffer location at the destination; and
   a token counter at each source, a value of said token counter being set to the number of said allocated buffers that is empty.

2. The system recited in claim 1, further comprising
   a hardwired logic front end connected to a network interface for receiving and transmitting data, said hardwired logic front end performing time critical operations and communicating received data to and data to be transmitted from said plurality of programmable processors,
   wherein the protocol conversion of data frames is performed such that related data frames are dispatched to a hardwired thread unit, the hardwired thread unit being the same hardwired thread unit for each said related data frame.

3. The system recited in claim 1, wherein each processor is capable of accessing memory of other processors.

4. The system recited in claim 3, wherein a first processor accesses memory of another processor by executing memory instructions.

5. The system recited in claim 4, wherein synchronization operations are performed in a controller of the accessed memory.

6. The system recited in claim 5, wherein a result of a synchronization operation on the memory of a processor is provided to the processor, the result indicating whether the synchronization operation was performed by the processor or by another processor.

7. The system recited in claim 1, wherein the source processor element has a token for each empty buffer location in the destination processor element, the source processor element decrements a token counter when the source processor sends a packet, and upon removing a received packet from an input buffer of the destination processor element, the destination processor element sends a signal to the source processor element to increment the token counter.

8. The system recited in claim 1, wherein said high-speed interconnect is a crossbar switch.

9. A system for converting network communications data between multiple communications protocols, the system comprising:
   a plurality of programmable processors, each processor having multiple hardwired thread units, each said hardwired thread unit being capable of fully executing programs, wherein the hardwired thread units are operable for performing communications protocol conversion of data frames;
   a plurality of memory units accessible by each of said plurality of programmable processors;
   a high speed interconnect for communications between said processors and between said processors and said memory units, there being a clock cycle of said system such that a round trip latency between transmission from a source and receipt of an acknowledgment from a destination is two or more of said clock cycles;
   means for implementing a multi-token counter protocol for pipelining communications between a source processor element and a destination processor element through said high-speed interconnect, a source processor element being a processor and a destination processor element being a processor or a processor memory,
   wherein the plurality of programmable processors perform data frame routing to another processor if a work queue of a processor receiving the data frame is above a threshold and if a work queue of the another processor is below a threshold;
   wherein the round trip latency between the source and the destination, measured in clock cycles, is equal to or less than a set number, and said means for implementing the multi-token counter protocol further comprising:
   means for allocating to each source, said set number of buffers at the destination; and
   means for providing each source with a token for each buffer location at the destination;
   a token counter at each source, a value of said token counter being set to the number of said allocated buffers that is empty.

10. The system recited in claim 9, wherein a first processor accesses memory of another processor by executing memory instructions.

11. The system recited in claim 10, wherein synchronization operations are performed in a controller of the accessed memory.

12. The system recited in claim 11, wherein a result of a synchronization operation on the memory of a processor is provided to the processor, the result indicating whether the synchronization operation was performed by the processor or by another processor.

13. The system recited in claim 9, wherein said means for implementing the multi-token protocol further comprising:
   means for decrementing the token counter upon transmission of a request from the source to the destination;
   means for incrementing the token counter upon receipt by the source of an acknowledgment from the destination that a request has been processed; and
   means for delaying transmission of a request by the source to the destination until the token counter has a value greater than zero.

14. The system recited in claim 9, wherein said high-speed interconnect is a crossbar switch.

15. The system recited in claim 9, further comprising
   a hardwired logic front end connected to a network interface for receiving and transmitting data, said hardwired logic performing time critical operations and communicating received data to and data to be transmitted from said plurality of programmable processors,
   wherein the protocol conversion of data frames is performed such that related data frames are dispatched to a hardwired thread unit, the hardwired thread unit being the same hardwired thread unit for each said related data frame.

* * * * *